US012640595B2

(12) United States Patent
Yuan et al.

(10) Patent No.: US 12,640,595 B2
(45) Date of Patent: May 26, 2026

(54) WIRELESS CHARGING ASSEMBLY WITH MAGNETICALLY-ISOLATED ATTACHMENT STRUCTURE WHEN PROVIDING CHARGE AND ELECTRONIC DEVICE HAVING THE SAME

(71) Applicants:Zhengzhou Wanmayun Electronic Technology CO., Ltd., Zhengzhou (CN); HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Bo-Duo Yuan, Shenzhen (CN); Yan-Lei Cao, Zhengzhou (CN); Hao-Xiang Li, Zhengzhou (CN)

(73) Assignees: Zhengzhou Wanmayun Electronic Technology CO. , Ltd, Zhengzhou (CN); HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 757 days.

(21) Appl. No.: 18/084,125

(22) Filed: Dec. 19, 2022

(65) Prior Publication Data

US 2024/0106282 A1      Mar. 28, 2024

(30) Foreign Application Priority Data

Sep. 26, 2022     (CN) .......................... 202211175972.5

(51) Int. Cl.
*H02J 50/70* (2016.01)
*H01F 27/36* (2006.01)
(Continued)

(52) U.S. Cl.
CPC ............ *H02J 50/70* (2016.02); *H01F 27/366* (2020.08); *H02J 50/005* (2020.01); *H02J 50/10* (2016.02)

(58) Field of Classification Search
CPC .......... H02J 50/70; H02J 50/005; H02J 50/10; H02J 7/0042; H02J 7/0044; H01F 27/366; H01F 27/02; H01F 38/14
See application file for complete search history.

(56) References Cited

U.S. PATENT DOCUMENTS

| | | | | |
|---|---|---|---|---|
| 8,269,595 B2 * | 9/2012 | Okada | ................. | H01F 27/2871 336/200 |
| 8,766,484 B2 * | 7/2014 | Baarman | ................. | H01F 38/14 307/104 |

(Continued)

FOREIGN PATENT DOCUMENTS

| | | | | |
|---|---|---|---|---|
| CN | 213937544 U | 8/2021 | | |
| CN | 217063391 U | * 7/2022 | | |
| WO | WO-2020262976 A2 | * 12/2020 | .............. | H02J 50/70 |

*Primary Examiner* — Jared Fureman
(74) *Attorney, Agent, or Firm* — ScienBiziP, P.C.

(57) ABSTRACT

A magnetically-isolated wireless charging assembly enabling temporary attachment by magnetism to a device requiring charge by induction includes a housing defining an accommodating space, a plurality of magnetic members disposed within the accommodating space, a wireless charging receiver covering the plurality of magnetic members, and a wireless charging receiver. The wireless charging receiver is disposed on a side of the magnetic shielding member facing the plurality of magnetic members and the magnetic shielding member prevents the magnetic field of the magnetic members extending through or beyond the shielding member.

17 Claims, 6 Drawing Sheets

(51) Int. Cl.
  *H02J 50/00* (2016.01)
  *H02J 50/10* (2016.01)

(56) References Cited

U.S. PATENT DOCUMENTS

| | | | | |
|---|---|---|---|---|
| 8,890,470 | B2 * | 11/2014 | Partovi | H02J 50/402 |
| | | | | 320/108 |
| 9,084,343 | B2 * | 7/2015 | Waffenschmidt | H01F 27/36 |
| 9,852,844 | B2 * | 12/2017 | Golko | H01F 27/366 |
| 9,861,017 | B2 * | 1/2018 | Borngräber | H02J 50/70 |
| 10,283,998 | B2 * | 5/2019 | Hong | H02J 7/0042 |
| 10,847,310 | B2 * | 11/2020 | Suzuki | H01F 27/36 |
| 11,258,308 | B2 * | 2/2022 | Jang | H02J 50/70 |
| 11,569,685 | B2 * | 1/2023 | Partovi | H02J 50/05 |
| 11,606,119 | B2 * | 3/2023 | Partovi | H02J 7/00304 |
| 11,805,631 | B2 * | 10/2023 | Lee | H01F 27/366 |
| 11,923,696 | B2 * | 3/2024 | Jia | H04B 5/79 |
| 11,968,816 | B2 * | 4/2024 | Jang | H01Q 1/38 |
| 11,979,026 | B2 * | 5/2024 | Hsiao | H05K 1/0203 |
| 12,355,270 | B2 * | 7/2025 | Lim | H02J 50/70 |
| 2010/0156344 | A1 * | 6/2010 | Inoue | H01F 27/361 |
| | | | | 320/108 |
| 2014/0177197 | A1 * | 6/2014 | Lampinen | H01F 38/14 |
| | | | | 156/60 |
| 2015/0326055 | A1 * | 11/2015 | Koyanagi | H02J 50/70 |
| | | | | 455/573 |
| 2024/0087803 | A1 * | 3/2024 | Spinella | H01F 27/366 |

\* cited by examiner

200

WIRELESS CHARGING ASSEMBLY WITH MAGNETICALLY-ISOLATED ATTACHMENT STRUCTURE WHEN PROVIDING CHARGE AND ELECTRONIC DEVICE HAVING THE SAME

FIELD

The subject matter herein generally relates to wireless charging, especially to a wireless charging assembly with magnetically-isolated attachment structure when providing charge and an electronic device having the wireless charging assembly.

BACKGROUND

A wireless charging assembly incorporated in a mobile phone generally includes a magnetic member for a temporary attachment during charging and a wireless charging receiver. The wireless charging receiver induces a current within the mobile phone to charge a battery of the mobile phone.

However, the magnetic member can interfere with an electromagnetic field of an antenna of the mobile phone and decrease strength of signal transmission of the mobile phone.

BRIEF DESCRIPTION OF THE DRAWINGS

Implementations of the present technology will now be described, by way of example only, with reference to the attached figures.

DETAILED DESCRIPTION

Figure 1:
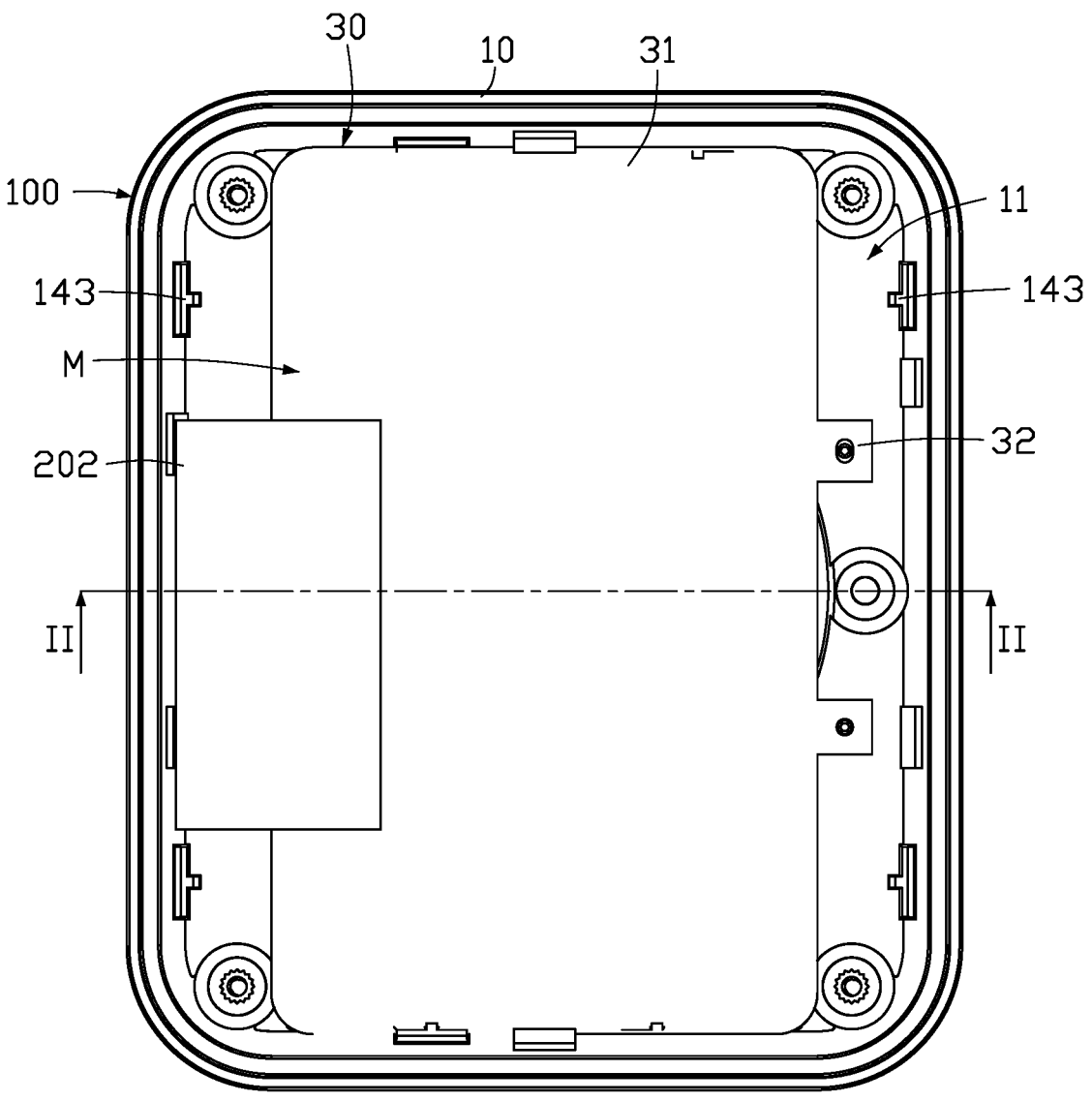
FIG. 1 is a top view of a wireless charging assembly including an antenna according to an embodiment of the present disclosure.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 5:
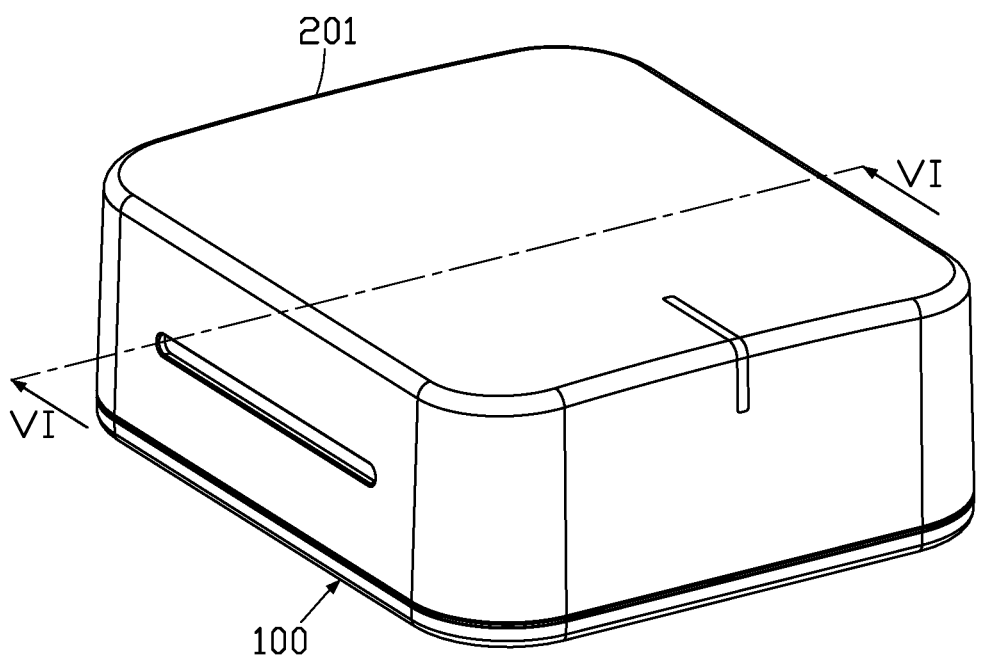
FIG. 5 is a diagrammatic view of an electronic device according to an embodiment of the present disclosure.

Referring to FIGS. 1 and 5, an embodiment of the present disclosure provides a wireless charging assembly 100. The assembly 100 includes a housing 10, a plurality of magnetic members 20, a magnetic shielding member 30, and a wireless charging receiver 40. The housing 10 defines an accommodating space 11. The magnetic members 20, the magnetic shielding member 30, and the wireless charging receiver 40 are arranged within the accommodating space 11. The magnetic shielding member 30 covers the magnetic members 20. The wireless charging receiver 40 is arranged on a surface of the magnetic shielding member 30 facing the magnetic members 20. A first direction A (shown in FIG. 2) is defined as a thickness direction of the housing 10. In the first direction A, the wireless charging receiver 40 is staggered from the magnetic members 20. In this embodiment, the magnetic members 20 are neodymium magnets. The magnetic shielding member 30 is a sheet of silicon steel, and the wireless charging receiver 40 is an induction coil. In other embodiments, the magnetic shielding member 30 may also made of pure iron, Fe—Ni, Fe—Co, Fe—Ni—Co, Fe—Si, Fe—Al—Si, or ferrite materials.

With the above configuration, the magnetic shielding member 30 can contain and restrict a magnetic field near the magnetic members 20 (shown in FIG. 2) and block the field from extending elsewhere. A magnetism-free region M is created above the magnetic shielding member 30. A component which is vulnerable to magnetic field, such as an antenna assembly 202, can be disposed in the magnetic-free region M, thereby reducing interference with the components by the magnetic member 20. Meanwhile, the magnetic field under the magnetic shielding member 30 is not affected, and the field allows the wireless charging assembly 100 to be brought into close and precise proximity with a device (not shown) requiring charge or recharge.

Figure 2:
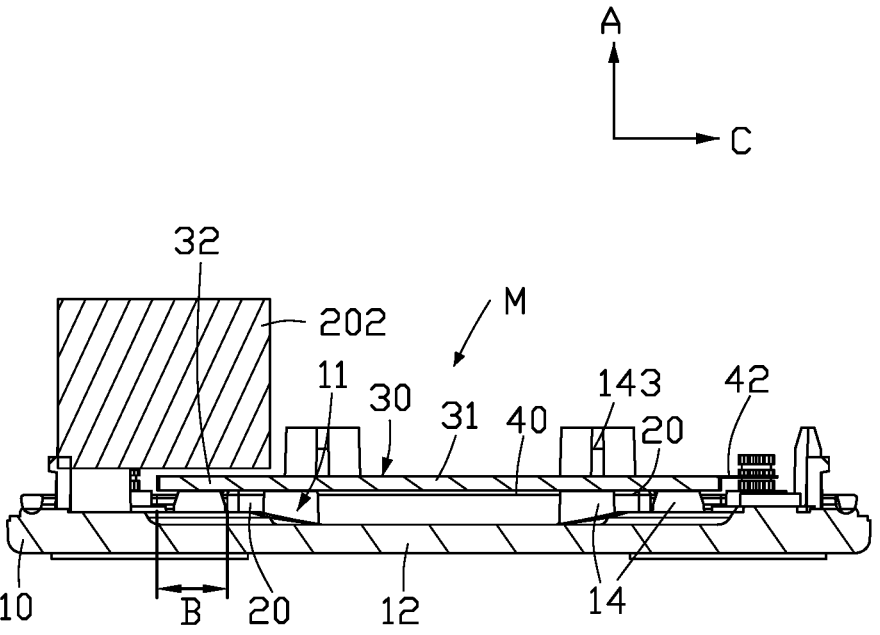
FIG. 2 is a cross-sectional view along line II-II of FIG. 1.
Figure 3:
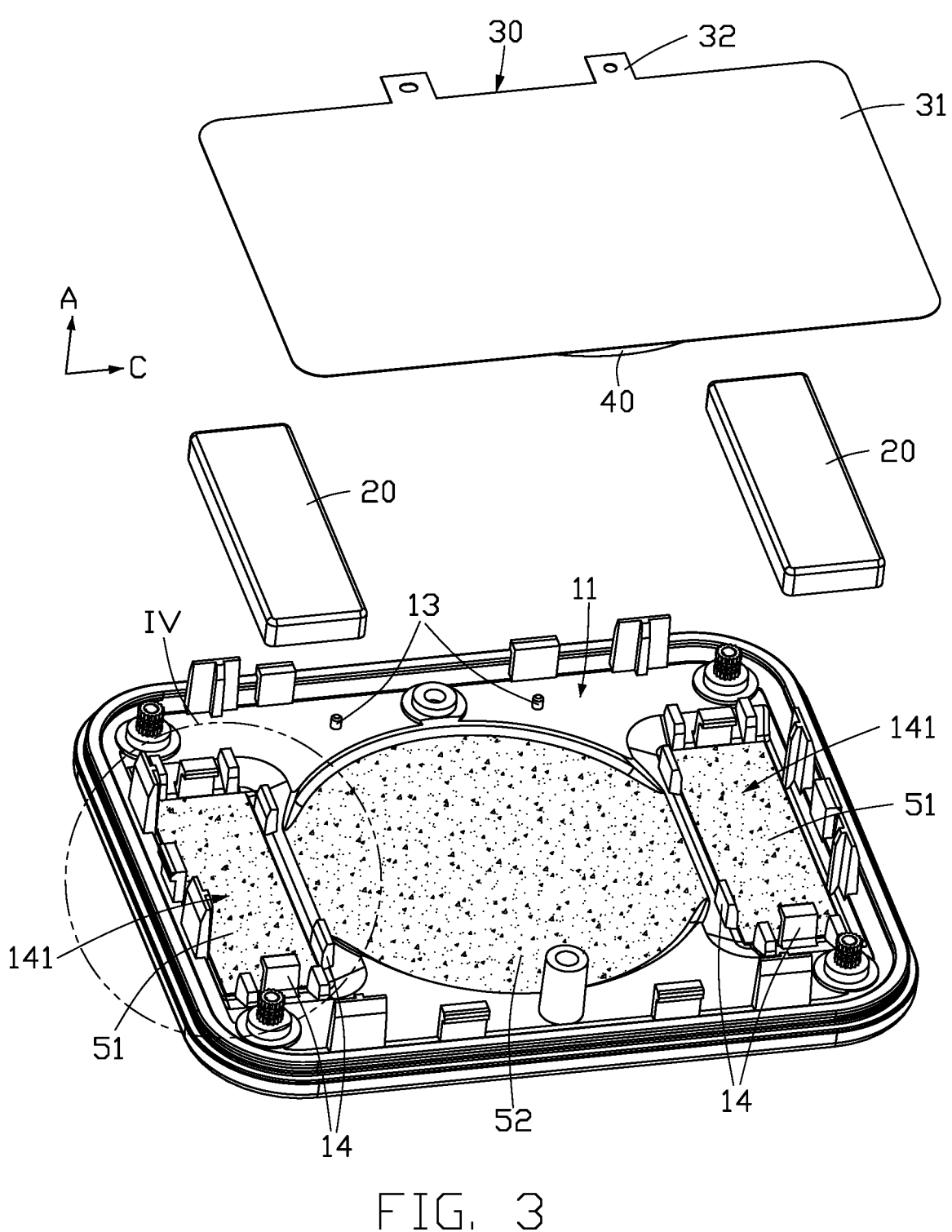
FIG. 3 is an exploded view of the wireless charging assembly of FIG. 1.

Referring to FIGS. 2 and 3, in this embodiment, two magnetic members 20 are spaced from each other. Viewed from the first direction A, the wireless charging receiver 40 is disposed between the two magnetic members 20. With the above configuration, the two magnetic members 20 have minimum interference on the wireless charging receiver 40. Hence, a power transmission efficiency between the wireless charging receiver 40 and the wireless charging transmitter is not affected.

Referring to FIG. 3, in this embodiment, the housing 10 includes a main body 12 and a plurality of first fixing posts 13 connected to the main body 12. The main body 12 is recessed inward to form the accommodating space 11. Each first fixing post 13 is disposed within the accommodating space 11 and extends along the first direction A. The first fixing posts 13 are spaced from each other. The magnetic shielding member 30 includes a central plate 31 and a plurality of mounting parts 32 connected around the central plate 31. The mounting parts 32 are connected to a periphery of the central plate 31. The central plate 31 covers the magnetic members 20. The first fixing posts 13 are fixed to the mounting parts 32. In this embodiment, the fixing posts 13 are fixed to the mounting parts 32 through screws.

Figure 4:
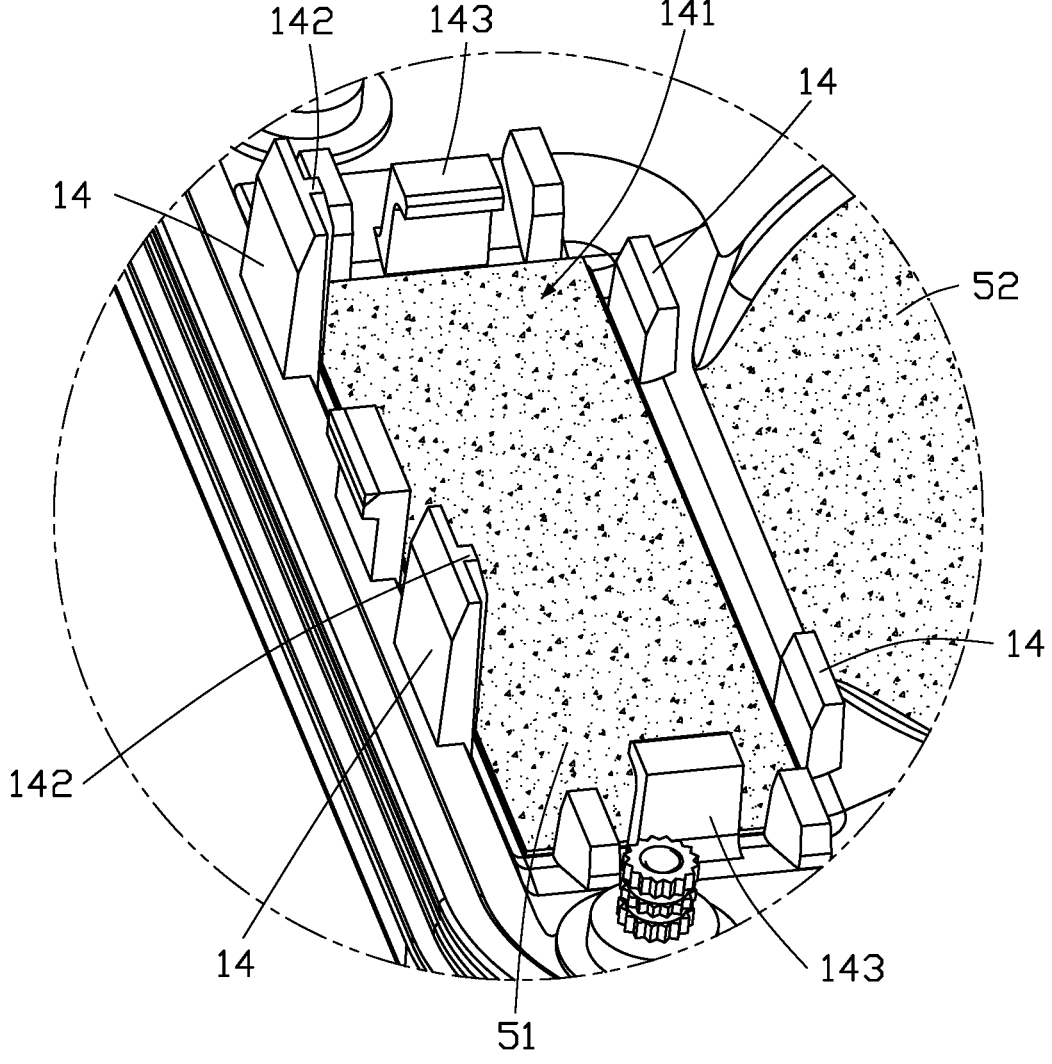
FIG. 4 is an enlarged view of region IV of FIG. 3.

Referring to FIGS. 3 and 4, in this embodiment, the housing 10 further includes a plurality of second fixing posts 14. The second fixing posts 14 are disposed inside the accommodating space 11 to form a receiving space 141. The magnetic member 20 is disposed within the receiving space 141. Hence, the wireless charging receiver 40 is spaced from the magnetic member 20, which further reduces adverse magnetic interference upon the wireless charging receiver 40.

Referring to FIGS. 3 and 4, in this embodiment, a side of the second fixing post 14 extends towards the receiving space 141 to form a first clamping part 142. The first clamping part 142 resists against a side surface the magnetic member 20. An end of the second fixing post 14 away from the main body 12 extends towards the receiving space 141 to form a second clamping part 143. The second clamping part 143 resists against a top surface of the magnetic member 20.

Referring to FIG. 2, in this embodiment, an edge of the magnetic member 20 is spaced from an edge of the magnetic shielding member 30. The magnetic shielding member 30 overhangs and covers the magnetic member 20 along the first direction A. A second direction C is defined as a length direction of the housing 10. Along the second direction C, a distance B between the edge of the magnetic member 20 and the magnetic shielding member 30 (that is, the length of overhang) is at least 1.5 mm. The magnetic shielding member 30 covering the magnetic member 20 reduces a magnetic field leakage of the magnetic member 20.

Referring to FIGS. 3 and 4, in this embodiment, the assembly 100 further incudes a first adhesive layer 51 and a second adhesive layer 52. The first adhesive layer 51 is disposed between the magnetic member 20 and a bottom of the accommodating space 11, achieving a stable connection between the magnetic member 20 and the housing 10. The second adhesive layer 52 is disposed between the wireless charging receiver 40 and the main body 12, achieving a stable connection between the wireless charging receiver 40 and the housing 10.

Figure 6:
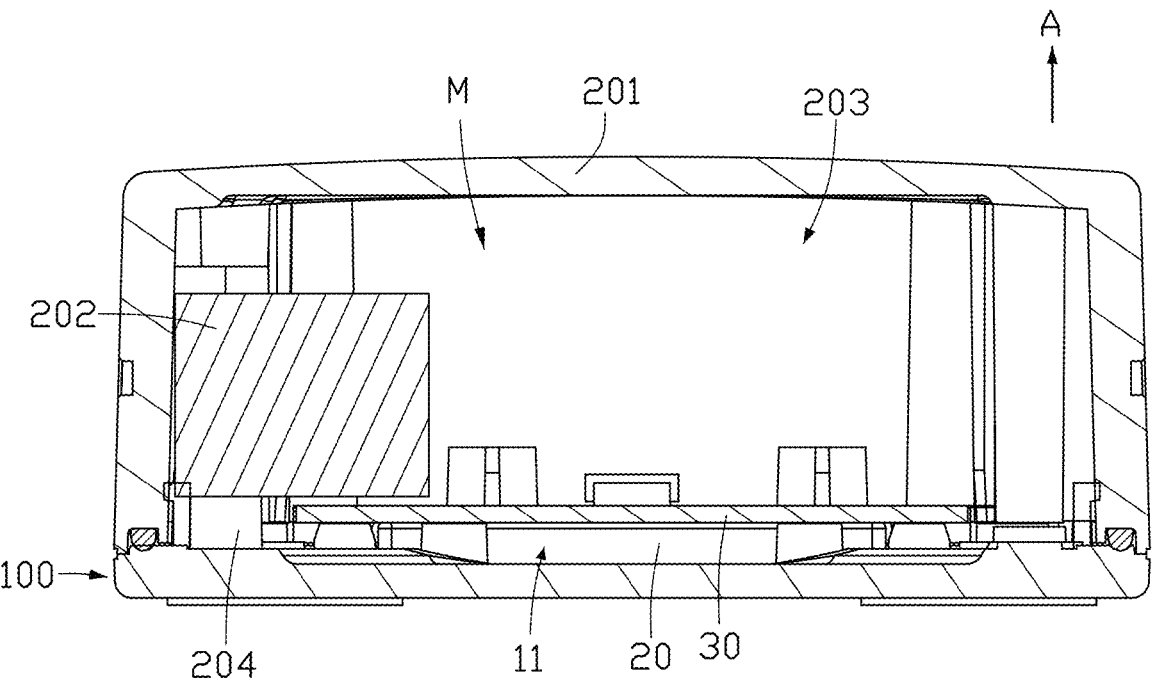
FIG. 6 is a cross-sectional view along line VI-VI of FIG. 5.

Referring to FIGS. 5 and 6, the embodiment also provides an electronic device 200. The electronic device 200 includes a cover plate 201, an antenna 202, and the charging assembly 100. A portion of the antenna 202 is disposed on a surface of the magnetic shielding member 30 opposite to the magnetic member 20. The cover plate 201 covers a side of the housing 10 away from the magnetic member 20 to form a receiving cavity 203. The magnetic member 20, the magnetic shielding member 30, and the wireless charging receiver 40 are disposed within the receiving cavity 203. With above configuration, the magnetic shielding member 30 blocks and limits the magnetic field of the magnetic member 20, thereby reducing interference between the magnetic member 20 and the antenna 202. In this embodiment, the electronic device 200 can be any device with wireless charging function, such as mobile phone, watch, tablet computer, or camera, etc.

Referring to FIGS. 5 and 6, in this embodiment, the electronic device 200 further includes a supporting port 204. The supporting port 204 is arranged between the main body 12 and another portion of the antenna 202, achieving a stable installation between the antenna 202 and the housing 10.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A wireless charging assembly comprising:
a housing defining an accommodating space;
a plurality of magnetic members;
a magnetic shielding member; and
a wireless charging receiver;

4 wherein the plurality of magnetic members is arranged within the accommodating space, the magnetic shielding member covers the plurality of magnetic members, the wireless charging receiver is disposed on a side of the magnetic shielding member facing the plurality of magnetic members, wherein the housing comprises a main body and a plurality of first fixing posts connected to the main body, the main body is recessed inwards to form the accommodating space, the plurality of first fixing posts is disposed inside the accommodating space, the magnetic shielding member comprises a central plate and a plurality of mounting parts connected around the central plate, each of the plurality of mounting parts is connected to a respective one of the plurality of first fixing posts.

2. The wireless charging assembly of claim 1, wherein the plurality of magnetic members comprises two magnetic members, the two magnetic members are spaced from each other, the wireless charging receiver is arranged between the two magnetic members.

3. The wireless charging assembly of claim 1, wherein the housing further comprises a plurality of second fixing posts connected to the main body, the plurality of second fixing posts is disposed around a respective one of the plurality of magnetic members.

4. The wireless charging assembly of claim 3, wherein a portion of the plurality of second fixing posts extends toward a side surface of the plurality of magnetic members to form a first clamping part, the first clamping part resists against the side surface of the plurality of magnetic members.

5. The wireless charging assembly of claim 3, wherein a portion of the plurality of second fixing posts extends toward a top surface of the plurality of magnetic members to form a second clamping part, the second clamping part resists against the top surface of the plurality of magnetic members.

6. The wireless charging assembly of claim 3, further comprising a first adhesive layer and a second adhesive layer, wherein the first adhesive layer is disposed between the plurality of magnetic members and a bottom of the accommodating space, the second adhesive layer is disposed between the wireless charging receiver and the main body.

7. The wireless charging assembly of claim 1, wherein a distance between an edge of the plurality of magnetic members and an edge of the magnetic shielding member is at least 1.5 mm.

8. The wireless charging assembly of claim 1, wherein the magnetic shielding member is a silicon steel sheet.

9. An electronic device comprising:
a cover plate,
an antenna; and
a wireless charging assembly comprising:
a housing defining an accommodating space;
a plurality of magnetic members;
a magnetic shielding member; and
a wireless charging receiver;
wherein the plurality of magnetic member is arranged within the accommodating space, the magnetic shielding member covers the plurality of magnetic members, the wireless charging receiver is disposed on a side of the magnetic shielding member facing the plurality of magnetic members;
wherein the housing comprises a main body and plurality of first fixing posts connected to the main body, the main body is recessed inwards to form the accommodating space, the plurality of first fixing posts is disposed inside the accommodating space, the magnetic shielding member comprises a central plate a plurality of mounting parts connected around the central plate, each of the plurality of mounting parts is connected to a respective one the plurality of first fixing posts;

a portion of the antenna is disposed on another side of the magnetic shielding member opposites to the plurality of magnetic members, the cover plate covers the housing from a side of the antenna.

10. The electronic device of claim 9, further comprising a supporting port, wherein the supporting port is arranged between the housing and another portion of the antenna.

11. The electronic device of claim 9, wherein the plurality of magnetic members comprises two magnetic members, the two magnetic members are spaced from each other, the wireless charging receiver is arranged between the two magnetic members.

12. The electronic device of claim 9, wherein the housing further comprises a plurality of second fixing posts connected to the main body, the plurality of second fixing posts is disposed around each of the plurality of magnetic members.

13. The electronic device of claim 12, wherein a portion of the plurality of second fixing posts extends toward a side surface of the plurality of magnetic members to form a first clamping part, the first clamping part resists against the side surface of the plurality of magnetic members.

14. The electronic device of claim 12, wherein a portion of the plurality of second fixing posts extends toward a top surface of the plurality of magnetic members to form a second clamping part, the second clamping part resists against the top surface of the plurality of magnetic members.

15. The electronic device of claim 12, wherein the wireless charging assembly further comprises a first adhesive layer and a second adhesive layer, wherein the first adhesive layer is disposed between the plurality of magnetic members and the bottom of the accommodating space, the second adhesive layer is disposed between the wireless charging receiver and the main body.

16. The electronic device of claim 9, wherein a distance between an edge of the plurality of magnetic members and an edge of the magnetic shielding member is at least 1.5 mm.

17. The electronic device of claim 9, wherein the magnetic shielding member is a silicon steel sheet.

* * * * *